(12) United States Patent
Alban

(10) Patent No.: US 6,449,898 B1
(45) Date of Patent: Sep. 17, 2002

(54) METHOD AND APPARATUS FOR ENHANCING COFFEE BEAN PRODUCTION

(76) Inventor: Joseph B. Alban, P.O. Box 472, Surfside, CA (US) 90743

(*) Notice: Subject to any disclaimer, the term of this patent is extended or adjusted under 35 U.S.C. 154(b) by 0 days.

(21) Appl. No.: 09/626,819

(22) Filed: Jul. 27, 2000

(51) Int. Cl.⁷ .......................... A01G 17/00; A01G 17/06
(52) U.S. Cl. ....................................................... 47/58.1
(58) Field of Search ........................... 47/58.1; 56/328.1

(56) References Cited

FOREIGN PATENT DOCUMENTS

JP          06141704 A   *   5/1994

OTHER PUBLICATIONS www.konajoe.com.*
www.jimssupply.com/vsystem, Figure.*
Handley, Drip Irrigation, Mar. 2000, Irrigation Journal, Mar./Apr. 2000.*
Savonen, Espalier training fo fruit trees is fun, Feb. 16, 2001, http://eesc.orst.edu/agcomwebfile/Garden/Fruit/espalier.html.*

* cited by examiner

Primary Examiner—Robert P. Swiatek
Assistant Examiner—Floris C Copier
(74) Attorney, Agent, or Firm—Kelly Bauersfeld Lowry & Kelley, LLP

(57) ABSTRACT

A method of enhancing coffee bean production including the steps of providing a trellis, planting coffee tree shoots along the trellis, and utilizing the trellis to open up the coffee tree in order to increase sun exposure thereon. The trellis includes aligned end assemblies spaced from one another and posts positioned between the end assemblies. At least one wire is interconnected between the end assemblies and attached to the posts in order to serve as an attachment to branches of the coffee trees planted along the trellis. Preferably, multiple wires are interconnected between the end assemblies and vertically spaced from one another along the length of the post. A drip hose may be attached to and extend along a length of one of the wires. Additional portions of the coffee tree are attached to the vertically spaced wires as the coffee tree grows.

9 Claims, 2 Drawing Sheets

METHOD AND APPARATUS FOR ENHANCING COFFEE BEAN PRODUCTION

BACKGROUND OF THE INVENTION

The present invention relates to coffee growing techniques. More particularly, the present invention relates to a method and apparatus for enhancing coffee bean production.

Coffee is the seed of a cherry from a tree which grows from sea level to approximately 6,000 feet in a narrow subtropical belt around the world. The three major growing regions are: Latin America and the Caribbean Islands, Africa and the Arabian Peninsula, and Indonesia. Coffee is also grown in Hawaii, India and in South East Asia.

Coffee trees are evergreens which grow to heights of up to twenty feet. To simplify harvesting, the trees are pruned to eight to ten feet. The coffee tree first produces delicate clusters of white blossoms, resembling jasmine in shape and scent. These blossoms last only a few days. Small green coffee cherries then begin to appear and ripen to yellow, then red, and finally almost black, within six to nine months. Coffee cherries ripen at different times, so they are predominantly picked by hand.

In addition to the species of the coffee, many other factors contribute to the overall quality of the beans. Seed stock, plantation location, soil composition, altitude, weather conditions, fertilization, cultivation, harvesting, and processing methods all have a dramatic influence on the finished product. It takes an average of four to five years for the coffee tree to produce its first crop. Approximately 2,000 cherries, or 4,000 coffee beans, must be harvested to produce just one pound of roasted coffee. The average coffee tree only produces one to two pounds of roasted coffee per year.

Today, coffee is a giant global industry employing more than twenty million people. This commodity ranks second only to petroleum in terms of dollars traded worldwide. With over four hundred billion cups consumed every year, coffee is the world's most popular beverage. Sales of premium specialty coffees in the United States have reached the multi-billion dollar level, and are increasing significantly on an annual basis.

Accordingly, there is a need for a method of enhancing coffee bean production from each tree. The present invention fulfills these needs and provides other related advantages.

SUMMARY OF THE INVENTION

The present invention relates to an apparatus and method for enhancing coffee bean production. The apparatus comprises a trellis having aligned end assemblies at a predetermined distance from one another. The end assemblies preferably comprise two aligned posts spaced from one another and having a brace therebetween, and a wire attached to a lower portion of one post at one end thereof and attached to an upper end of the other post at the other end thereof. At least one wire is interconnected between the end assemblies. The wires serve as an attachment to branches of coffee trees planted along the apparatus. Posts are positioned between the end assemblies and attached to the wires. Preferably, multiple wires are vertically spaced from one another and secured along the vertical length of the post. A drip hose is attached to and extends along the length of the bottom wire.

After providing such a trellis, coffee tree seedlings are planted along the trellis and the trellis is utilized to open up the coffee tree in order to increase sun exposure thereon. This accomplished by attaching a portion of the coffee tree shoots to the at least one wire of the trellis in order to open up the coffee tree and increase sun exposure thereon. Additional portions of the coffee tree are attached to the wires as the coffee tree grows. The trellis allows the coffee tree to be opened resulting in increased photosynthetic activity, fewer gaps between trees, and increased crop production per acre.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
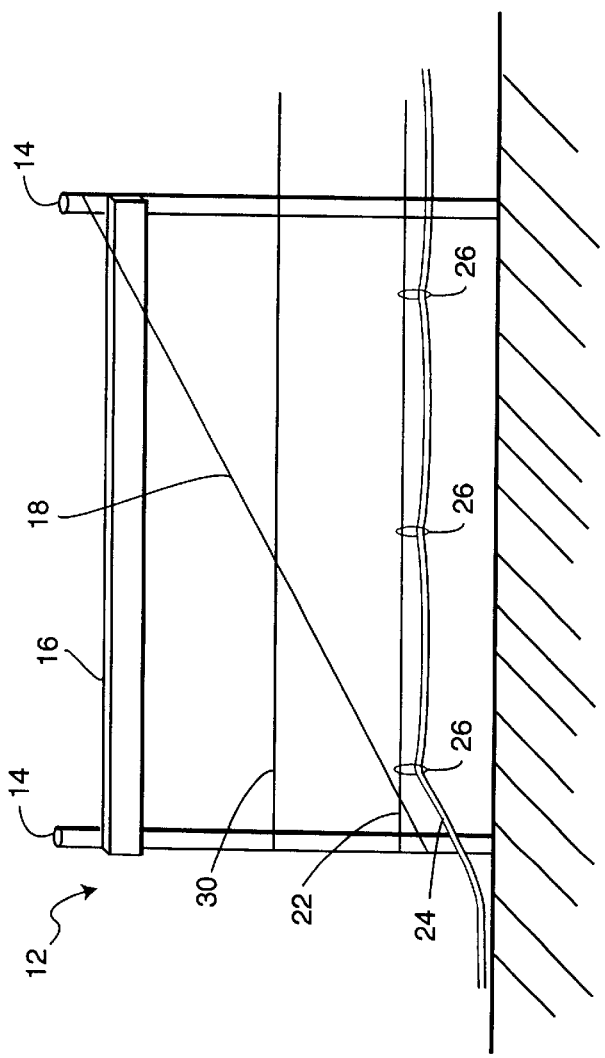
FIG. 1 is an elevational view of an end assembly used in accordance with the invention.
Figure 2:
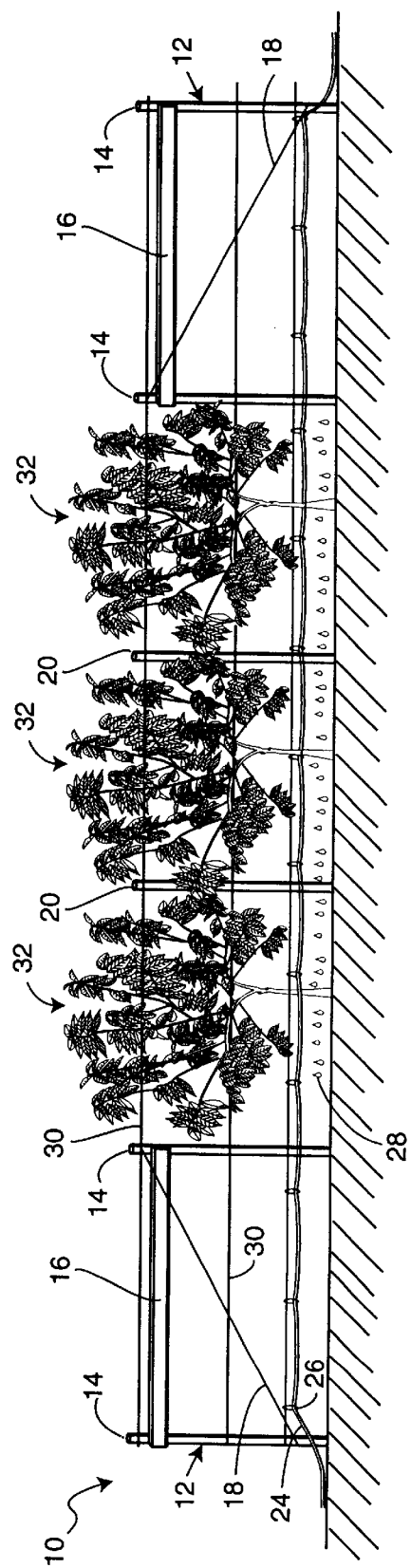
FIG. 2 is a schematic view of a trellis embodying the present invention, and having several coffee trees attached thereto.
Figure 3:
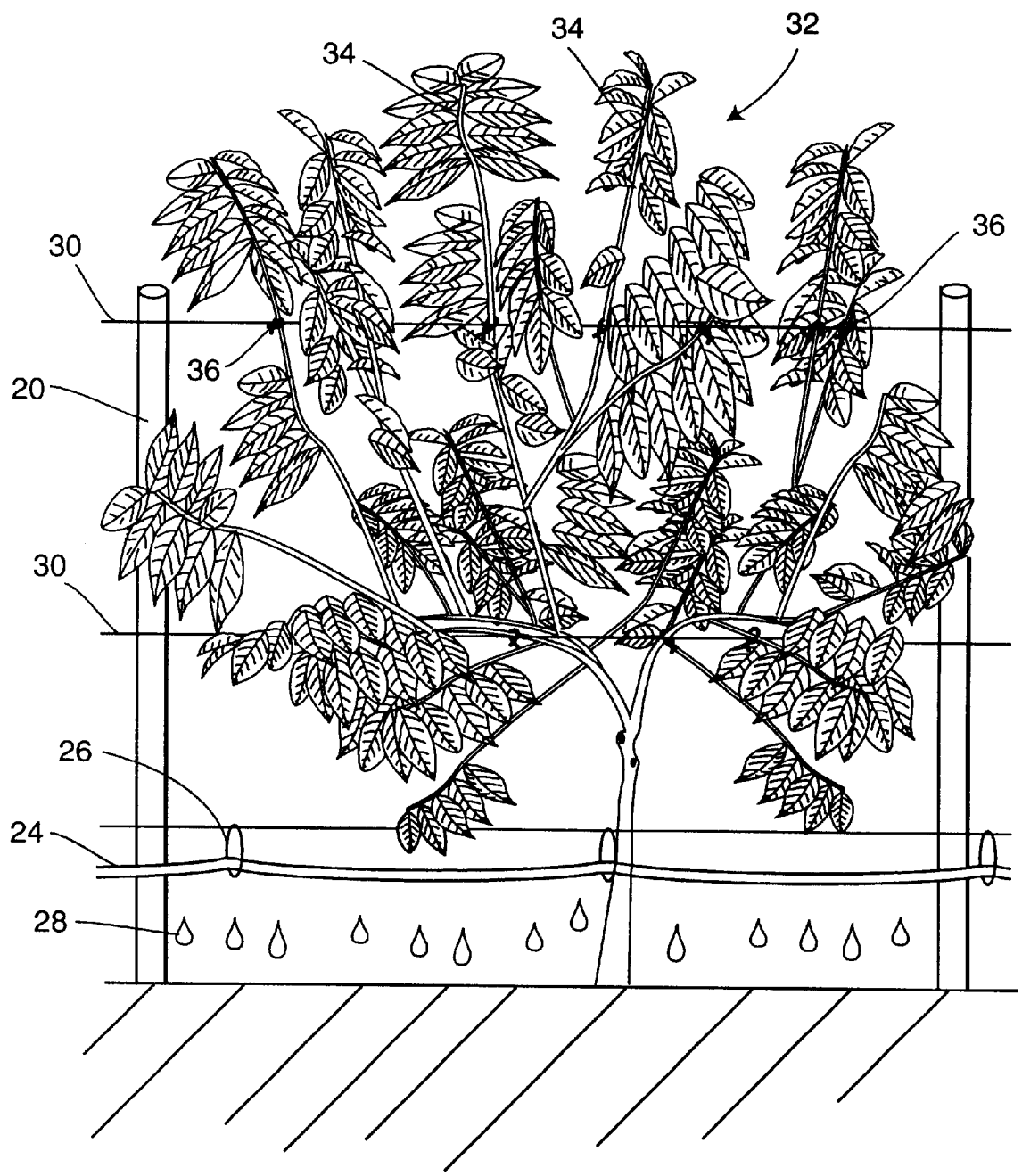
FIG. 3 is a representative view of a coffee tree attached to wires of the trellis of the present invention.

As shown in the drawings for purposes of illustration, the present invention is concerned with an apparatus in the form of a trellis which is utilized to enhance coffee bean production. The trellis 10 is an elaborate fencing system similar to that used for the production of grapes.

With reference to FIG. 1, the trellis includes a pair of aligned end assemblies 12 space a predetermined distance from one another. The end assemblies 12 include two aligned end posts 14 typically eight feet in length and seven inches in diameter. The posts 14 are placed into the ground upright at a depth of sixteen inches. The posts are preferably spread apart approximately seventy-five inches. A cross brace 16 is placed between the two upright posts 14 and secured in place with notches, wires, nails, or the like. The brace 16 is preferably five inches in diameter and placed approximately twelve inches below the top of the aligned upright posts 14. A 10 gauge wire 18 is placed near the bottom of the first upright post 14 and extended diagonally to the top of the second upright post 14 to secure the assembly 12. The end post assemblies 12 are placed at either end of the crop row.

Eight foot T-posts 20 are aligned with the end post assemblies 12 and spaced preferably one hundred and forty-two inches apart. The T-posts 20 are placed upright twenty-one inches into the ground. At a distance of fifteen inches above the ground, a 14 gauge wire 22 is strung between the two end assemblies 12 and attached to each of the T-post 20 between the assemblies 12. A drip hose 24 is attached to the 14 gauge wire using nylon hose clamps 26. Removing the drip hose 24 from contact with the ground provides several advantages. By suspending the drip hose 24 from the trellis 10, dirt cannot easily lodge and block the exit of water 28 from apertures formed in the drip hose 24. Elevating the drip hose 24 also provides additional protection from natural wildlife as animals have more difficulty accessing the drip hose 24.

A 10 gauge wire is strung between the two end assemblies 12 and attached to each of the T-posts 20 approximately 28 inches above the ground along the crop row.

If currently not in place, coffee tree shoots 32 are planted along the trellis 10 between the end assemblies 12. The coffee trees 32 are attached to the 10 gauge wire 30 by tying vertical shoots and branches 34 to the wire 30 with farmers tape 36 or the like. As the tree 32 grows, additional 10 gauge attachment wires 30 are attached to the end assemblies 12 and T-posts 20 so as to be vertically spaced from the lower 10 gauge wire 30. Preferably, the additional wires 30 are placed at a distance of five to five and one-half feet above the ground to complete the trellis 10.

Utilization of the trellis 10 allows the coffee tree 32 to be opened. This results in a wider tree 32 with increased photo-synthetic activity related to increased sun exposure of the individual branches 34 of the tree 32. Fewer gaps exist between the trees 32 as they can be more closely spaced due to the mechanical and organization benefits of the trellis 10, increasing crop production per acre.

Although an embodiment has been described in detail for purposes of illustration, various modifications may be made without departing from the scope and spirit of the invention. Accordingly, the invention is not to be limited, except as by the appended claims.

What is claimed is:

1. A method of enhancing coffee bean production, comprising the steps of:
   providing a trellis;
   planting coffee tree shoots along the trellis; and
   utilizing the trellis to open up the coffee tree and increase sun exposure thereon.

2. The method of claim 1, wherein the providing step includes the step of constructing a trellis comprising aligned end assemblies spaced a predetermined distance from one another and having wires interconnected therebetween, and posts positioned between the end assemblies and attached to the wires.

3. The method of claim 2, wherein the planting step includes the step of planting coffee tree shoots between the end assemblies of the trellis and attaching a portion of the coffee tree shoots to the wires of the trellis in order to open up the coffee tree and increase sun exposure thereon.

4. The method of claim 2, including the step of connecting a drip hose to a bottom wire.

5. The method of claim 2, wherein the wires are vertically spaced from one another along the length of the posts.

6. The method of claim 5, including the step of attaching additional portions of the coffee tree to the wires as the coffee tree grows.

7. A method of enhancing coffee bean production, comprising the steps of:
   providing a trellis having aligned end assemblies spaced a predetermined distance from one another and having wires interconnected therebetween, and posts positioned between the end assemblies and attached to the wires;
   planting coffee tree shoots between the end assemblies of the trellis and attaching a portion of the coffee tree shoots to the wires of the trellis; and
   connecting a drip hose to a bottom wire;
   wherein utilization of the trellis opens up the coffee tree and increases sun exposure thereon.

8. The method of claim 7, wherein the wires are vertically spaced from one another along the length of the posts.

9. The method of claim 8, including the step of attaching additional portions of the coffee tree to the wires as the coffee tree grows.

* * * * *